(12) United States Patent
Choquet

(10) Patent No.: US 8,256,945 B2
(45) Date of Patent: Sep. 4, 2012

(54) INTERIOR LINING COMPONENTS FOR MOTOR VEHICLES

(75) Inventor: Alain Choquet, Lesquin (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 312 days.

(21) Appl. No.: 12/434,087

(22) Filed: May 1, 2009

(65) Prior Publication Data

US 2009/0316401 A1    Dec. 24, 2009

(30) Foreign Application Priority Data

Jun. 20, 2008    (FR) ...................... 08 54093

(51) Int. Cl.
*G02B 6/00* (2006.01)

(52) U.S. Cl. ........ 362/551; 362/555; 362/554; 362/556; 362/488; 362/511

(58) Field of Classification Search ........... 362/576, 362/570, 565, 511, 488, 554, 555, 558, 551, 362/556

See application file for complete search history.

(56) References Cited

U.S. PATENT DOCUMENTS

| | | | | |
|---|---|---|---|---|
| 4,234,907 A * | 11/1980 | Daniel | ........................... | 362/556 |
| 4,519,017 A | 5/1985 | Daniel | | |
| 4,727,603 A * | 3/1988 | Howard | ............................ | 2/115 |
| 6,854,869 B1* | 2/2005 | Fernandez | ..................... | 362/488 |
| 7,237,933 B2* | 7/2007 | Radu et al. | ..................... | 362/488 |
| 7,431,484 B2* | 10/2008 | Fong | ............................. | 362/489 |
| 2004/0037091 A1* | 2/2004 | Guy | ............................. | 362/582 |
| 2007/0279929 A1* | 12/2007 | Peng et al. | ..................... | 362/556 |

FOREIGN PATENT DOCUMENTS

| | | |
|---|---|---|
| DE | 102005036533 A1 | 2/2007 |
| DE | 202007006413 U1 | 7/2007 |
| DE | 102006012606 A1 | 11/2007 |
| GB | 2435684 A | 9/2007 |
| WO | 0177441 A1 | 10/2001 |

* cited by examiner

*Primary Examiner* — Robert May

(74) *Attorney, Agent, or Firm* — Dickinson Wright PLLC

(57) ABSTRACT

An interior lining component for a motor vehicle made from an opaque material skin and capable of transmitting a visible light from one side of the component to the other side of the component. The component may include an embroidery pattern performed in the opaque material skin that transmits the visible light coming from at least one light source located behind the component. The embroidery may be formed with a light transmitting member, such as transparent thread applied to the opaque material of the component.

18 Claims, 1 Drawing Sheet

INTERIOR LINING COMPONENTS FOR MOTOR VEHICLES

BACKGROUND OF THE INVENTION

1. Technical Field

This invention involves the domain of interior linings or supports comprising illuminated areas or parts for decoration, for the creation of moods, or ambiance, or the displaying of messages. In particular, it involves an interior lining component for a motor vehicle equipped with at least such an illuminated area.

2. Discussion

There are two solutions on the market that permit the integration of illuminated areas on or inside a flexible support. The first of such solutions incorporates optical fibers into a textile by weaving the latter onto such textile and by cutting the optical fibers locally to enable the light to exit the light tube formed by each optical fiber. In this case, the light source may be an electroluminescent diode with very high brightness. This specific configuration permits symbols or messages to appear on the textile. However, this solution has some drawbacks, including the very high cost of such a textile, and potential long-term reliability problems because the connections between the optical fibers and the light source are very fragile and sensitive.

The second solution incorporates electroluminescent diodes in the textile, through openings provided for such purpose. However, this solution is not satisfactory because it represents a high cost by virtue of the components used and the need for numerous stages of manufacturing.

SUMMARY OF THE INVENTION

The present invention eliminates these drawbacks by using a lining component that includes at least an area or portion that is capable of transmitting visible light that is simple to achieve, easy to manufacture and durable over time.

More specifically, this invention is directed to an interior lining component for a motor vehicle made of a skin of an opaque material capable of transmitting a visible light from the back of the component to the front of the component, characterized in that each component is made up with or formed with a transparent thread performed in the skin made of opaque material. The transparent thread is capable of easily transmitting the visible light coming from at least a luminous source located on the back of said component, and may allow for many types of stitches, patterns and embroidery.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
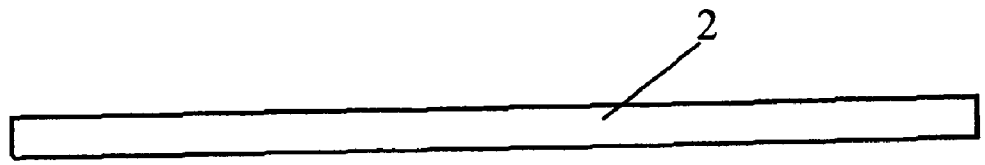
FIG. 1 represents a lining component according to the invention before doing the embroideries.
Figure 2:
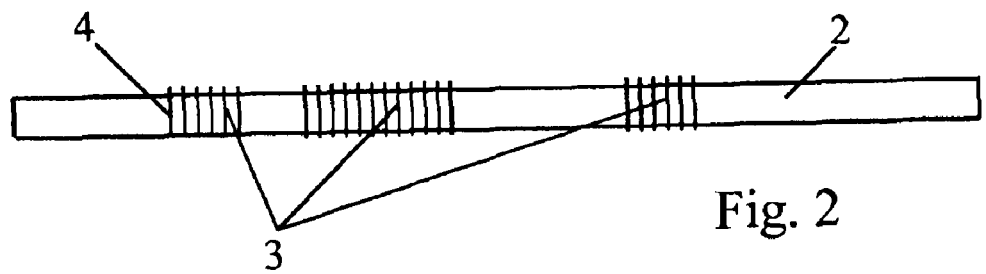
FIG. 2 represents a lining component of FIG. 1 provided with three embroideries.

Referring now to the drawings, the Figures attached represent an interior lining component 1 for a motor vehicle made from a skin of an opaque material 2. The opaque material generally acts as a light transmitting barrier. The component 1 includes a light transmitting member 4 disposed in the opaque material that is capable of transmitting a visible light between the back (also called the non-visible side) of the component 1 and the front (also called the front side) of the component 1. The light transmitting member 4, such as a continuously extending light transmitting member and more particularly, a transparent thread, may from a pattern such as an embroidery 3 made in the skin of opaque material 2. The light transmitting member 4 transmits the visible light coming from a light source 5 located on the back side or nonvisible side of the component 1.

By opaque material, one should understand that the material forming the component does not let visible light pass through. The use of an opaque material permits the creation of well-defined areas corresponding to light transmitting areas formed by the embroideries 3. When the embroideries 3 are transmitting light from the light source, no light is transmitted or diffused at the areas of the opaque material juxtaposed to the embroideries 3. As such, the embroideries 3 are distinctly visually when lit. In addition, the opaque material skin 2 must also be able to be embroidered.

To allow for ease of manufacturing, the embroidery or embroideries 3 are preferred to be formed by conventional methods. It is preferable that the opaque material of the component 1 or light transmitting members 4 do not require any special preparation or manufacturing techniques and thereby allows reduced cost and more efficient manufacturing processes in making holes in the opaque material of the component 1, in particular when compared to the methods of incorporating diodes or optical fibers, as is the case in the previous state of the art.

No contact, no connection and no hookup is required between the light transmitting members, such as the transparent thread 4 forming the embroidery 3 and the light source(s) 5 for embroidery 3 to transmit the light from the light source(s) 5 to the front side of the component. For an efficient transmission of light, it suffices that the light from the light source(s) 5 is sufficiently close to the embroideries 3 and/or sufficiently strong or powerful.

Figure 3:
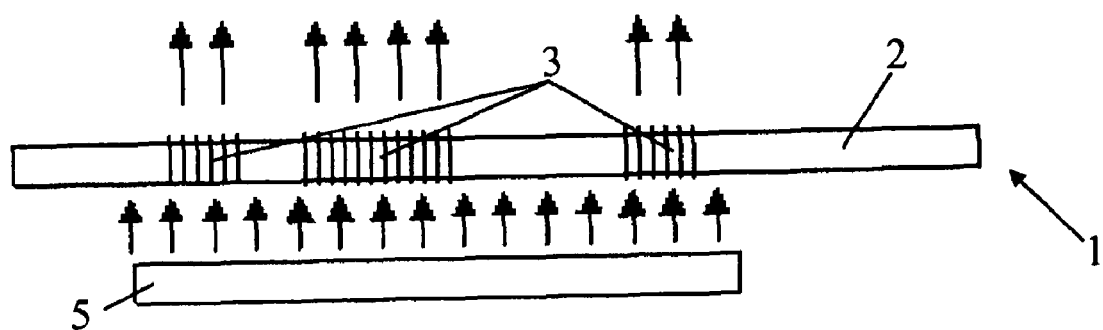
FIG. 3 represents the lining component according to the invention in which the embroideries emit the light originating from a light source mounted behind the latter.

Under these conditions and as shown more particularly in FIG. 3, component 1 may include several embroideries 3 and the sole light source 5 shows a surface structure extending under the embroideries 3.

The interior lining component 1 according to the invention can include several light sources 5 each associated with one or several embroideries 3. As such, one can associate one light source 5 per embroidery 3 or else associate one source with several embroideries 3.

The opaque material skin 2 can for instance be made of leather or a synthetic or thermoplastic material. In the interior space of a car, such materials are commonly used. The invention permits as such to incorporate light points or lighted areas in areas not foreseen for that purpose, either to broadcast a message, or to create an atmosphere or a particular mood or provide new methods of task lighting inside the car through the incorporation of lighting arrangements.

The light source 5 can be an electroluminescent film positioned against the non-visible back side of the opaque material skin 2, as shown in FIG. 3.

It can also be made up of a light diffuser that guides and diffuses the light coming from one or several electroluminescent diodes or lamps and that is positioned against the non-visible back side of the opaque material skin 2.

Light source 5 can also be in the form of one or several lamps or one or several electroluminescent diodes. Under these conditions, it can be provided that said light sources 5 are incorporated in one or several black boxes positioned behind the opaque material skin 2.

As such, the invention permits interior lining components 1 for vehicles capable of presenting light areas or points made up of embroideries 3, lit from the back, for which the life span is extended with respect to the known devices, and for which the embodiment is easy and not expensive.

The light transmitting members 4 are different than the prior art light transmitting fiber optic components. More specifically, optical fibers require total internal reflection to carry light along its longitudinal length, thereby requiring precise alignment of the ends of the optic fibers with the light source. For comparison, the light transmitting members of the present invention do not require total internal reflection or the precise alignment required in the prior art. The light transmitting members of the present invention allow light applied to the outer circumference of the light transmitting members, in particular, anywhere along its length and to be transmitted along its length, not just to the ends, which is not possible with optical fibers. More specifically, the light transmitting member 4 is configured to allow lateral light sources to pass laterally through the member 4 or laterally into member 4 and then longitudinally along the member all the while capable of exiting laterally along the longitudinal extent, such as a short distance from the entrance of the light. As compared to the fiber optics of the prior art, which only allowed light to exit the tip or end, the light transmitting members or transparent thread of the present invention allows easy manufacturing using common processes and eliminates the need to place and secure fiber optic ends where the light enters and exists. More specifically, as defined in the present application, light transmitting members do not include members which integrally include the light source such as diodes and do not include members that require total internal reflection or only are capable of substantially communicating light between the ends of the member, S-class optic fibers.

It is well understood that the invention is not limited to the mode of embodiment described and represented in the attached drawings. Modifications are always possible, such as from the point of view of makeup of the various components or by substituting technical equivalents, without exceeding the boundaries of the protection domain of the invention.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An interior lining component of a motor vehicle made from an opaque material skin (2), comprising:
   at least one light source;
   at least one light transmitting member capable of transmitting a visible light from the back of said component to the front of said component, characterized in that each light transmitting member is different than optical fibers and instead is made up of a transparent thread (4) having ends and sides with an outer circumference extending therebetween and wherein said light transmitting thread forms an embroidery (3) in the opaque material skin (2) that transmits the visible light originating from the least one light source (5) located at the back of said component (1) facing the outer circumference of the thread, to the front of said component and wherein said light transmitting thread does not require total internal reflection, and wherein light entering a first point on said outer circumference of said sides located on the back of said component to exit a second point on said outer circumference of said sides located on the said front of said component.

2. The interior lining component, according to claim 1, characterized in that the component includes several embroideries (3) and in that the single light source (5) presents a surface structure that extends under said embroideries (3).

3. The interior lining component, according to claim 1, characterized in that the component includes several light sources (5) each associated with one or several embroideries (3).

4. The interior lining component, according to claim 1, characterized in that the opaque material skin (2) is made of leather or a synthetic or thermoplastic material.

5. The interior lining component, according to claim 1, characterized in that the light source (5) is an electroluminescent film positioned against the back of the opaque material skin (2).

6. The interior lining component, according to claim 1, characterized in that the light source (5) is made up of a light diffuser that guides and diffuses the light originating from one or several electroluminescent diodes or lamps and that is position against the non-visible back of the opaque material skin (2).

7. The interior lining component, according to claim 1, characterized in that the light source (5) takes on the form of one or several lamps.

8. The interior lining component, according to claim 1, characterized in that the light source (5) takes on the form of one or several electroluminescent diodes.

9. An interior lining component for vehicles,
   said component comprising:
   at least one light source;
   a skin of opaque material having a first side and a second side; an embroidery formed from a single light transmitting member having at least one transparent thread with a longitudinal extent having an outer circumference between two ends;
   the at least one light source disposed facing one of the sides and the circumference of the thread; and
   wherein said light transmitting member passes through said skin at multiple locations and wherein at each location, said light transmitting transmits emitted light from the at least one light source laterally through the single light transmitting member with the light entering and exiting said outer circumference between said first and second sides.

10. The interior lining component of claim 9 wherein said light transmitting member passes between said locations, each capable of transmitting light between said first and second sides and is substantially unbroken between each of said locations.

11. The interior lining component of claim 10 wherein said light transmitting member includes a longitudinal extent and a circumferential outer extent and wherein said light is capable of entering through said circumferential outer extent at a point of entry and exiting at a distance removed from said point of entry along said longitudinal extent through said circumferential outer extent.

12. The interior lining component of claim 9 wherein said light transmitting member is a transparent thread.

13. The interior lining component of claim 12 wherein said transparent thread is capable of being stitched using conventional stitching machines and processes for interior components of vehicles.

14. The interior lining component of claim 9 including multiple embroideries, and wherein each embroidery includes a distinct unbroken light transmitting member passing between said locations for each embroidery.

15. An interior lining component for vehicles comprising:
- at least one light source;
- a skin of opaque material having a visible surface and an opposing back surface and wherein said opaque material substantially blocks the transmission of light between the back surface and the visible surface;
- at least one transparent thread having an outer circumference stitched to said skin; the at least one light source disposed facing the back surface of the opaque material and the outer circumference of the thread; and
- wherein each of said at least one transparent thread passes through said skin at multiple locations creating stitch points to secure said transparent thread to said skin and wherein said transparent thread is unbroken as it passes between said multiple locations creating stitch points and wherein said transparent thread passes emitted light from the at least one light source between said visible surface and said opposing back surface at each of said multiple locations, with light entering and exiting said outer circumference.

16. The component of claim 15 wherein each of said at least one transparent thread forms a separate embroidery pattern on the visible surface of said skin and wherein within a particular embroidery pattern.

17. The component of claim 15 wherein said component includes a light source coupled to the back surface.

18. The component of claim 17 wherein said light source is and electroluminescent film.

* * * * *